L. SMITH.
SURGICAL OPERATING TABLE.
APPLICATION FILED APR. 6, 1917.
1,267,812.
Patented May 28, 1918.
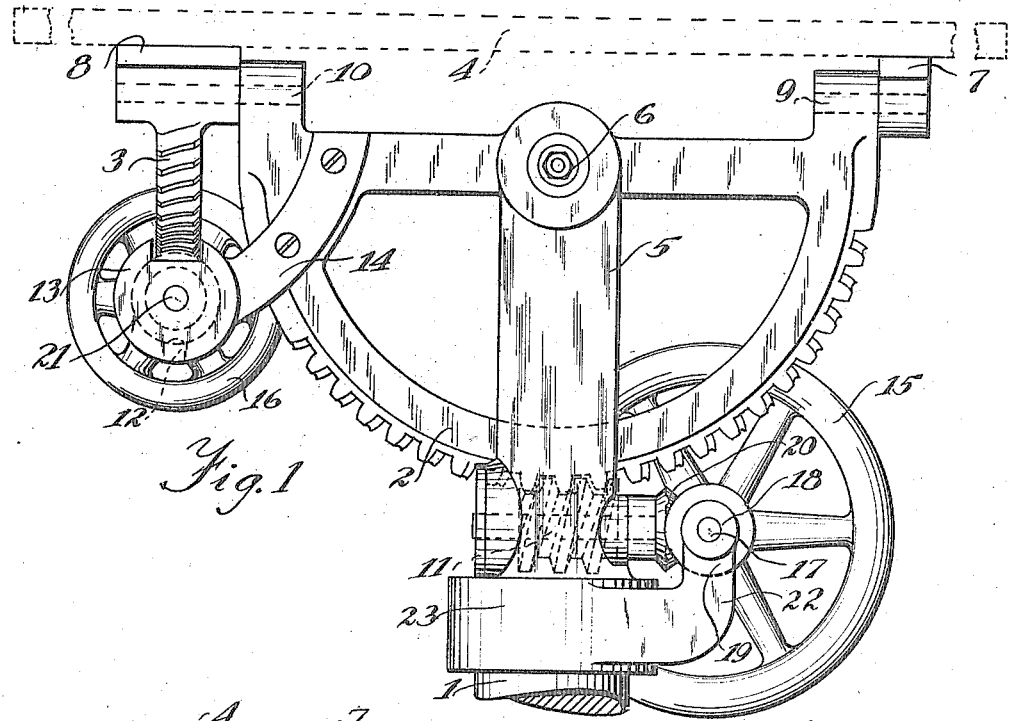
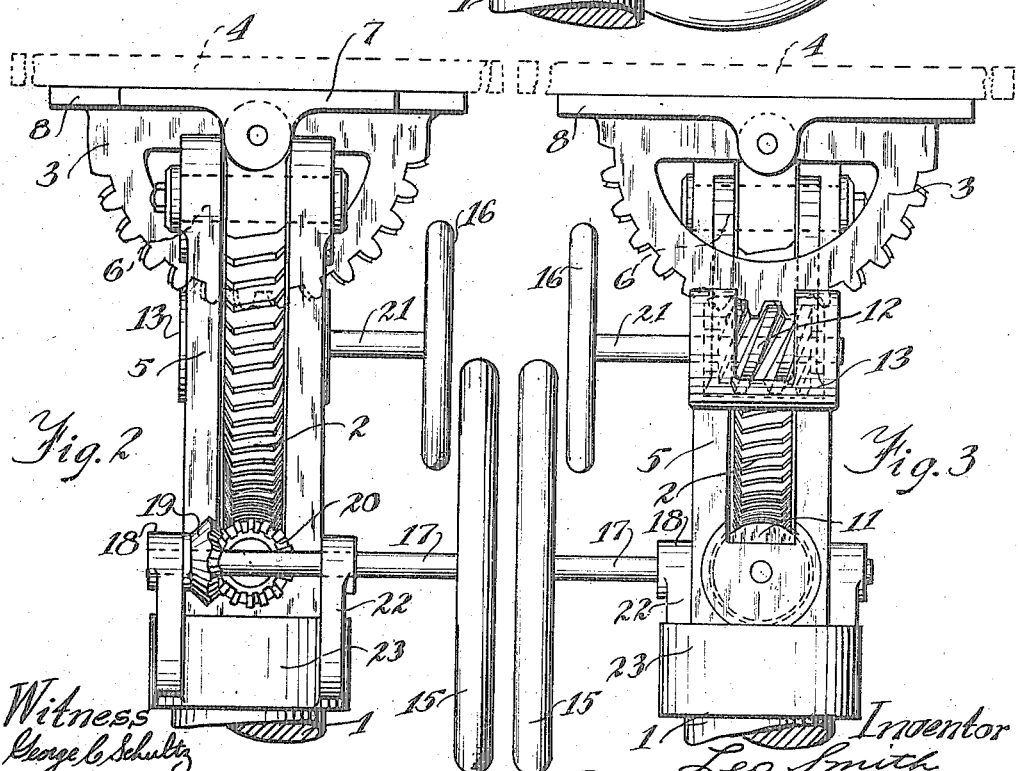
Witness
George C. Schultz
Inventor
Leo Smith,
By Rummler & Rummler
Attys.

UNITED STATES PATENT OFFICE.

LEO SMITH, OF HAMMOND, INDIANA, ASSIGNOR TO FRANK S. BETZ COMPANY, OF HAMMOND, INDIANA, A CORPORATION OF INDIANA.

SURGICAL OPERATING-TABLE.

1,267,812.

Specification of Letters Patent.

Patented May 28, 1918.

Application filed April 6, 1917. Serial No. 160,158.

*To all whom it may concern:*

Be it known that I, LEO SMITH, a citizen of the United States of America, and a resident of Hammond, county of Lake, and State of Indiana, have invented certain new and useful Improvements in Surgical Operating-Tables, of which the following is a specification.

The main objects of this invention are to provide an adjustable supporting device for tables and the like, which device is operable so that the table may be set at substantially any desired longitudinal or transverse angle; to provide such a supporting device wherein the angular adjustments of the table in one direction may be effected independently of the angular adjustments in the other; to provide supporting means of this kind embodying self-locking mechanism whereby the table is held in any angular position to which it is shifted, regardless of the weight thereon; and to provide supporting means of this kind which is of light but rigid construction and which is simple and convenient to operate.

An illustrative embodiment of this invention is shown in the accompanying drawings, in which—

Figure 1 is a side elevation of the improved form of adjustable supporting device particularly designed for surgical operating tables.

Fig. 2 is a right end view of the same.

Fig. 3 is a left end view of the same.

The specific embodiment herein illustrated comprises a standard 1, a pair of members 2 and 3, in the form of gear sectors, adjustably arranged relative to each other and to the standard, so that a table 4 (indicated in dotted outline in the figures) may be adjusted to occupy substantially any desired angle within certain limits, longitudinally or transversely of the length thereof.

The standard may be of any suitable construction and should be mounted upon a base (not shown), the size and shape of which will depend upon the use to which the table is to be put. The upper end of the standard is shaped to provide a fork 5 within which the gear sector 2 is supported by means of a stud shaft 6 secured at the upper ends of the fork 5.

The member or gear sector 2 is substantially a full semi-circular element, upon the ends of which brackets 7 and 8 are mounted. The brackets 7 and 8 are supported on trunnions or stud shafts 9 and 10, the axes of which are alined and disposed substantially perpendicular to the axis of the stud shaft 6. These brackets are arranged so as to be secured to the under side of the table 4, whereby it is firmly supported in place on the standard.

The member or gear sector 3 is formed on the under side of the bracket 8, being, in the embodiment here shown, an integral part thereof. This gear sector is also substantially a semi-circular element.

Worms 11 and 12 are journaled on the standard 1 and member 2 respectively, so as to mesh with the respective gear sectors 2 and 3. The worm 11 is journaled at the base of the fork 5 on an axis disposed in the plane of the gear sector 2, and the worm 12 is journaled in bearings 13 on an axis substantially parallel to the axis of the gear sector 2. The bearings 13 are formed on the ends of arms 14 and secured to the opposite sides of the gear sector 2.

Hand wheels 15 and 16 are provided for rotating the worms 11 and 12 respectively. The hand wheel 15 is secured to a shaft 17 journaled in bearings 18 at right angles to the axis of the worm 11 and parallel to the axis of the gear sector 2. Beveled gears 19 and 20 are secured respectively to the shaft 17 and the shaft 20.1 which carries the worm 11, whereby the rotation of the hand wheel 15 is communicated to said worm. The hand wheel 16 is secured directly to the shaft 21 which carries the worm 12 and supports it on the bearings 13.

The bearings 18 are formed on the ends of arms 22 carried by a collar 23 rigidly secured on the standard 1 below the worm 11.

The operation of the device shown is as follows:

When it is desired to adjust the angular disposition of the table 4 longitudinally of its length, the hand wheel 15 is rotated, whereupon through the action of the gears 19 and 20, the worm 11 is rotated so as to revolve the gear sector 2 about the axis of its supporting shaft 6. When it is desired to adjust the angular disposition of the table transversely of its length, the hand wheel 16 is rotated, which rotates the worm 12 and causes a partial revolution of the gear sector 3. The arrangement of the gear sectors 2 and 3 is such that they are each shiftable through an angle of very close to 180°, so that the table may be set at almost any angle longitudinally or transversely of its length, nearly 90° either way from the horizontal.

The use of the worm and gear in this arrangement provides a self-locking mechanism which insures the retention of the table in any angle at which it may be placed, regardless of the load thereon.

Although but one specific embodiment of this invention is herein shown and described, it will be understood that numerous details of the construction shown may be altered or omitted without departing from the spirit of this invention as defined by the following claims.

I claim:—

1. In a device of the class described, the combination of a standard, a gear sector tiltably mounted on said standard on a transverse axis, a second gear sector tiltably mounted on said first mentioned gear sector on an axis transverse to said standard and substantially perpendicular to the axis of said first mentioned gear sector, said gear sectors coacting to support a table, gearing journaled on said standard and meshing with said first mentioned gear sector, other gearing journaled on said first mentioned gear sector and meshing with said second mentioned gear sector, and means for operating said gearing whereby to shift said gear sectors relative to said standard and to each other for the purpose of adjusting the angular disposition of the table with respect to said standard.

2. In a device of the class described, the combination of a standard, a gear sector tiltably mounted on said standard on a transverse axis, a second gear sector tiltably mounted on said first mentioned gear sector on an axis transverse to said standard and substantially perpendicular to the axis of said first mentioned gear sector, said gear sectors coacting to support a table, gearing journaled on said standard and meshing with said first mentioned gear sector, other gearing journaled on said first mentioned gear sector and meshing with said second mentioned gear sector, and separate means for operating said first and second mentioned gearing whereby to shift said gear sectors independently of each other, relative to said standard for the purpose of adjusting the angular disposition of the table with respect to said standard.

3. In a device of the class described, the combination of a standard, a substantially semi-circular gear sector tiltably mounted on said standard on a transverse axis, a bracket tiltably mounted on said gear sector on an axis substantially perpendicular to the axis of said gear sector, said bracket being adapted to support a table thereon, a gear sector formed on said bracket and disposed substantially perpendicular to said first mentioned gear sector, gearing journaled on said standard and meshing with said first mentioned gear sector, other gearing journaled on said first mentioned gear sector and meshing with said second mentioned gear sector, and means for operating said gearing whereby to shift said gear sectors relative to said standard and to each other for the purpose of adjusting the angular disposition of the table with respect to said standard.

4. In a device of the class described, the combination of a standard, a substantially semi-circular gear sector tiltably mounted on said standard on a transverse axis, a pair of brackets tiltably mounted on the ends of said gear sector in axial alinement with each other, which axis is substantially perpendicular to the axis of said gear sector, said brackets being adapted to support a table thereon, one of said brackets having a gear sector formed thereon and disposed substantially perpendicular to said first mentioned gear sector, gearing journaled on said standard and meshing with said first mentioned gear sector, other gearing journaled on said first mentioned gear sector and meshing with said second mentioned gear sector, and means for operating said gearing whereby to shift said gear sectors relative to said standard and to each other for the purpose of adjusting the angular disposition of the table with respect to said standard.

5. In a device of the class described, the combination of a standard, a gear sector tiltably mounted on said standard on a transverse axis, a second gear sector tiltably mounted on said first mentioned gear sector on an axis transverse to said standard and substantially perpendicular to the axis of said first mentioned gear sector, said gear sectors coacting to support a table, a worm journaled on said standard and meshing with said first mentioned gear sector, a hand wheel also journaled on said standard on an axis substantially parallel to the axis of said first mentioned gear sector and having gearing connecting it with said worm, a second worm journaled on said first mentioned gear sector and meshing with said second gear sector, and a hand wheel connected to said second worm and having the axis thereof disposed substantially parallel to the axis of said first mentioned gear sector, said hand wheels being adapted to be manipulated for adjusting the angular disposition of the table with respect to the standard.

6. In a device of the class described, the combination of a standard, a gear sector tiltably mounted on said standard on a transverse axis, a second gear sector tiltably mounted on said first mentioned gear sector on an axis transverse to said standard and substantially perpendicular to the axis of said first mentioned gear sector, said gear sectors coacting to support a table, a worm journaled on said standard and meshing with said gear sector, a hand wheel also journaled on said standard on an axis substantially parallel to the axis of said first mentioned gear sector and having gearing connecting it with said worm, a second worm journaled on said first mentioned gear sector, and a hand wheel connected to said worm and having the axis thereof disposed substantially parallel to the axis of said first mentioned gear sector, said hand wheels being adapted to be independently manipulated for adjusting the angular disposition of the table with respect to the standard.

Signed at Hammond, Ind., this 30th day of March, 1917.

LEO SMITH.

Copies of this patent may be obtained for five cents each, by addressing the "Commissioner of Patents, Washington, D. C."